United States Patent
Wen

(10) Patent No.: US 11,600,057 B2
(45) Date of Patent: Mar. 7, 2023

(54) METHOD FOR PROCESSING MULTIMODAL IMAGES, APPARATUS, DEVICE AND STORAGE MEDIUM

(71) Applicant: Beijing Baidu Netcom Science Technology Co., Ltd., Beijing (CN)

(72) Inventor: Shengzhao Wen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 37 days.

(21) Appl. No.: 17/355,368

(22) Filed: Jun. 23, 2021

(65) Prior Publication Data
US 2021/0319251 A1   Oct. 14, 2021

(30) Foreign Application Priority Data

Oct. 19, 2020   (CN) .......................... 202011118853.7

(51) Int. Cl.
*G06K 9/46*   (2006.01)
*G06V 10/44*  (2022.01)
(Continued)

(52) U.S. Cl.
CPC ......... *G06V 10/443* (2022.01); *G06K 9/6256* (2013.01); *G06T 7/33* (2017.01);
(Continued)

(58) Field of Classification Search
CPC ............... G06V 10/443; G06V 40/197; G06V 40/1365; G06V 40/172; G06T 7/55;
(Continued)

(56) References Cited

U.S. PATENT DOCUMENTS 7,956,890 B2 * 6/2011 Cheng .................... G06V 40/10
382/118
9,313,200 B2 * 4/2016 Hoyos .............. G06Q 20/40145
(Continued)

FOREIGN PATENT DOCUMENTS

CN      109192302 A   1/2019
CN      107137107 B   2/2020
(Continued)

OTHER PUBLICATIONS

European Search Report of corresponding European Patent Application No. 21181680.6, dated May 30, 2022, 13 pages.
(Continued)

*Primary Examiner* — Gregory M Desire
(74) *Attorney, Agent, or Firm* — Tucker Ellis LLP

(57) ABSTRACT

Provided are a method for processing multimodal images, an apparatus, a device and a storage medium. Multiple types of vision sensors are disposed in first preset identity recognition scenario. The method includes: if it is determined that a first vision sensor detects a biometric part of a target object, controlling each vision sensor to separately perform image acquisition for the biometric part in accordance with a preset acquisition strategy to obtain a target visual image of corresponding type and acquisition time information of the target visual image; performing identity recognition for the target object according to first target visual image to determine object identification information corresponding to first target visual image; determining object identification information corresponding to a target visual image of other
(Continued)

type other than first target visual image according to acquisition time information of each target visual image and object identification information corresponding to first target visual image.

20 Claims, 7 Drawing Sheets

(51) Int. Cl.
| | |
|---|---|
| *G06T 7/55* | (2017.01) |
| *G06T 7/33* | (2017.01) |
| *G06K 9/62* | (2022.01) |
| *G06V 40/16* | (2022.01) |
| *G06V 40/18* | (2022.01) |
| *G06V 40/12* | (2022.01) |

(52) U.S. Cl.
CPC ............ *G06T 7/55* (2017.01); *G06V 40/1365* (2022.01); *G06V 40/172* (2022.01); *G06V 40/197* (2022.01); *G06T 2207/10024* (2013.01); *G06T 2207/10028* (2013.01)

(58) Field of Classification Search
CPC ............. G06T 7/33; G06T 2207/10024; G06T 2207/10028; G06K 9/6256
See application file for complete search history.

(56) References Cited

U.S. PATENT DOCUMENTS

| | | | |
|---|---|---|---|
| 9,870,458 B2 * | 1/2018 | Jo | ............................ G06F 21/32 |
| 10,339,362 B2 * | 7/2019 | Othman | ............. G06V 40/1371 |
| 10,813,563 B2 * | 10/2020 | Sund, Sr. | ................. G06T 7/254 |
| 11,012,599 B2 * | 5/2021 | Talbert | ................. A61B 5/4887 |
| 11,096,602 B2 * | 8/2021 | Gurevich | ............... G06V 10/82 |
| 2016/0078294 A1 | 3/2016 | Venkatesha et al. | |

FOREIGN PATENT DOCUMENTS

| | | |
|---|---|---|
| KR | 2020-0079095 A | 7/2020 |
| WO | 2020088622 A1 | 5/2020 |

OTHER PUBLICATIONS

Partial European Search Report dated Nov. 30, 2021 for Application Serial No. EP21181680.6.

* cited by examiner

METHOD FOR PROCESSING MULTIMODAL IMAGES, APPARATUS, DEVICE AND STORAGE MEDIUM

CROSS-REFERENCE TO RELATED APPLICATION

This application claims priority to Chinese Patent Application No. 202011118853.7, filed on Oct. 19, 2020, which is hereby incorporated by reference in its entirety.

TECHNICAL FIELD

The present application relates to the technical fields of computer vision and deep learning in artificial intelligence and, in particular, to a method for processing multimodal images, an apparatus, a device and a storage medium.

BACKGROUND

Multimodal images refer to multiple images obtained through acquisition for the same object using different vision sensors. The multimodal images are widely used in the field of biometrics (biological recognition), and biometrics technologies have a wide range of application needs in scenarios such as public security, national defense, transportation, finance, medical treatment and civil security control.

In the prior art, when multimodal images are acquired and processed to determine object identifications corresponding to the images, it is necessary to set a specific acquisition scenario and obtain a specific acquisition object, then put the specific acquisition object in the specific acquisition scenario to perform directional acquisition using a corresponding vision sensor, and record object identification corresponding to an acquired image manually, which results in less efficient multimodal image processing and high-cost acquisition and processing.

SUMMARY

The present application provides a method for processing multimodal images, an apparatus, a device and a storage, which solve the technical problem of less efficient multimodal image processing and high-cost acquisition and processing in the prior art.

According to an aspect of the present application, a method for processing multimodal images is provided. The multimodal images are acquired using multiple types of vision sensors, and the multiple types of vision sensors are disposed in a first preset identity recognition scenario. The method includes:

if it is determined that a first vision sensor detects a biometric part of a target object, controlling each vision sensor to separately perform image acquisition for the biometric part in accordance with a preset acquisition strategy to obtain a target visual image of a corresponding type and acquisition time information of the target visual image;

performing identity recognition for the target object according to a first target visual image to determine object identification information corresponding to the first target visual image;

determining object identification information corresponding to a target visual image of other type other than the first target visual image according to the acquisition time information of each target visual image and the object identification information corresponding to the first target visual image.

According to another aspect of the present application, an apparatus for processing multimodal images is provided. The multimodal images are acquired using multiple types of vision sensors, and the multiple types of vision sensors are disposed in a first preset identity recognition scenario. The apparatus includes:

an image acquisition control module, configured to: if it is determined that a first vision sensor detects a biometric part of a target object, control each vision sensor to separately perform image acquisition for the biometric part in accordance with a preset acquisition strategy to obtain a target visual image of a corresponding type and acquisition time information of the target visual image;

an identity recognition module, configured to perform identity recognition for the target object according to a first target visual image to determine object identification information corresponding to the first target visual image;

an identification determination module, configured to determine object identification information corresponding to a target visual image of other type other than the first target visual image according to the acquisition time information of each target visual image and the object identification information corresponding to the first target visual image.

According to yet another aspect of the present application, an electronic device is provided, including:

at least one processor; and a memory communicatively connected with the at least one processor; where, the memory stores thereon instructions executable by the at least one processor, and the instructions are executed by the at least one processor to enable the at least one processor to execute the method according to an aspect mentioned above.

According to still another aspect of the present application, a non-transitory computer-readable storage medium is provided, storing thereon computer instructions which are used to cause the computer to execute the method according to an aspect mentioned above.

According to the method for processing multimodal images, the apparatus, the device and the storage medium, if it is determined that the first vision sensor detects the biometric part of the target object, each vision sensor is controlled to separately perform image acquisition for the biometric part in accordance with the preset acquisition strategy to obtain the target visual image of the corresponding type and the acquisition time information of the target visual image; identity recognition is performed for the target object according to the first target visual image to determine the object identification information corresponding to the first target visual image; and the object identification information corresponding to the target visual image of other type other than the first target visual image is determined according to the acquisition time information of each target visual image and the object identification information corresponding to the first target visual image. Since a target visual image acquired by an original vision sensor in the identity recognition scenario can be used to perform recognition for the target object, and time of acquiring corresponding target visual images among multiple vision sensors is associated, the object identification information corresponding to the target visual image of other type can be determined through the acquisition time information of each target visual image. Automatic acquisition of multimodal images and determination of object identification are realized. The efficiency of multimodal image processing is improved, and the cost of acquisition and processing is reduced.

It should be understood that the content described in this section is not intended to identify the key or important features of the embodiments of the present application, nor to limit the scope of the present application. Other features of the present application will be easily understood through the following description.

BRIEF DESCRIPTION OF DRAWINGS

The drawings are used to facilitate understanding of the solutions and do not constitute a limitation on the present application. In the drawings.

DESCRIPTION OF EMBODIMENTS

Figure 1:
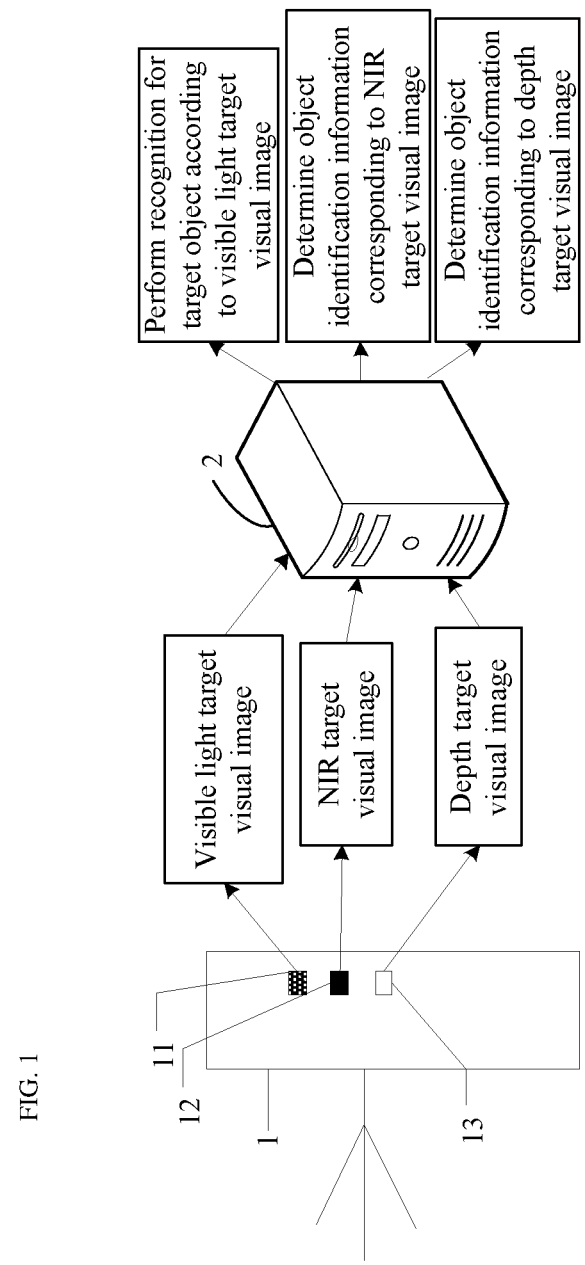
FIG. 1 is an application scenario diagram of a method for processing multimodal images provided according to an embodiment of the present application.

Exemplary embodiments of the present application are described below with reference to the accompanying drawings, including multiple types of details of the embodiments of the present application to facilitate understanding, which should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

In order to clearly understand the technical solutions of the present application, the technical solution of the prior art is first introduced in detail.

In the prior art, when acquiring multimodal images, it is first necessary to dispose corresponding vision sensors in a specific acquisition scenario, for example, dispose an NIR vision sensor and a lidar in a clear room. Secondly, a specific acquisition object is determined, for example, a need to acquire facial images of employees of a company is determined, and appointments with the employees of the company are made. Then the specific acquisition object is placed in a specific acquisition scenario for directional acquisition using corresponding vision sensors, and object identifications corresponding to the acquired images is recorded manually. For example, employees of the company enter a room one after another. The NIR vision sensor and the lidar are used to acquire facial images respectively. After uploading the acquired facial images to an electronic device, names, ID numbers and other information of employees corresponding to the acquired facial images are labeled manually. Therefore, in the prior art, when acquiring multimodal images and determining object identifications corresponding to the images, it is first necessary to install multimodal vision sensors in a specific acquisition scenario, determine and make an appointment with an acquisition object, and after multimodal images are acquired, manually record object identification corresponding to the acquired multimodal images, which results in less efficient multimodal image processing and high-cost acquisition and processing.

Therefore, in the face of the technical problem of less efficient multimodal image processing and high-cost acquisition and processing in the prior art, the inventor found in the study that, at present, it has been widely used in identity recognition scenarios that a onefold vision sensor acquires a biometrics part image and identifies a target object according to the biometrics part image. Moreover, identity recognition scenarios are widely applied to the fields of public security, national defense, transportation, finance, medical treatment, and civil security control. Therefore, an original vision sensor in an existing identity recognition scenario can be utilized to acquire an image of a biometrics part, and other type of vision sensor can be installed on the basis of the original one type of vision sensor, so that after the original vision sensor detects a biometric part of the target object, each vision sensor is controlled to separately perform image acquisition for the biometric part in accordance with a preset acquisition strategy to obtain a target visual image of a corresponding type and acquisition time information of the target visual image. Then, identity recognition is performed for the target object according to the target visual image acquired by the original vision sensor, and after determining object identification information corresponding to the target visual image, object identification information corresponding to the target visual image acquired by other type of vision sensor is determined according to the acquisition time information of all target visual images and the object identification information corresponding to the target visual image acquired by the original vision sensor.

Since the target visual image acquired by the original vision sensor in the identity recognition scenario can be used to perform identity recognition for the target object, and time of acquiring corresponding target visual images among multiple vision sensors is associated, the object identification information corresponding to the target visual image of other type can be determined through the acquisition time information of each target visual image. Automatic acquisition of multimodal images and determination of object identification are realized. The efficiency of multimodal image processing is improved, and the cost of acquisition and processing is reduced.

Based on the above innovative discovery, the inventor proposed the technical solutions of the present application. An application scenario of a method for processing multimodal images provided by the present application is described below.

As shown in FIG. 1, an application scenario provided by an embodiment of the present application may include multiple types of vision sensors and an electronic device. As shown in FIG. 1, the multiple types of vision sensors may include: a visible light vision sensor 11, an NIR vision sensor 12 and a lidar 13. The electronic device 2 communicates with the multiple types of vision sensors. The multiple types of vision sensors are disposed in a first preset identity recognition scenario, for example, disposed on an apparatus such as an access control door and a gate machine. As shown in FIG. 1, multiple types of vision sensors are disposed on a gate machine 1. A target object needs to pass identity recognition. After passing the identity recognition, the access control door or the gate machine is opened for passing through. When the target object appears in front of the access control door or the gate machine, a first vision sensor detects a biometric part of the target object, such as a human face, palm print, fingerprint, iris, etc. After the electronic device determines that the first vision sensor detects the biometric part of the target object, the electronic device controls each vision sensor to separately perform image acquisition for the biometric part in accordance with a preset acquisition strategy to obtain a target visual image of a corresponding type and acquisition time information of the target visual image. For example, in FIG. 1, the obtained target visual images include: a visible light target visual image (i.e., a first target visual image), an NIR target visual image, and a depth target visual image. Then identity recognition is performed for the target object according to the first target visual image to determine object identification information corresponding to the first target visual image; object identification information corresponding to target visual images of other types other than the first target visual image is determined according to the acquisition time information of each target visual image and the object identification information corresponding to the first target visual image. Finally, the electronic device 2 can associatively store the target visual images of other types with the corresponding object identification information in a database.

It can be understood that the method for processing multimodal images provided by the present application can also be applied in other application scenarios, which is not limited in the embodiments.

Embodiments of the present application will be described in detail with reference to the drawings as follow.

Embodiment 1

Figure 2:
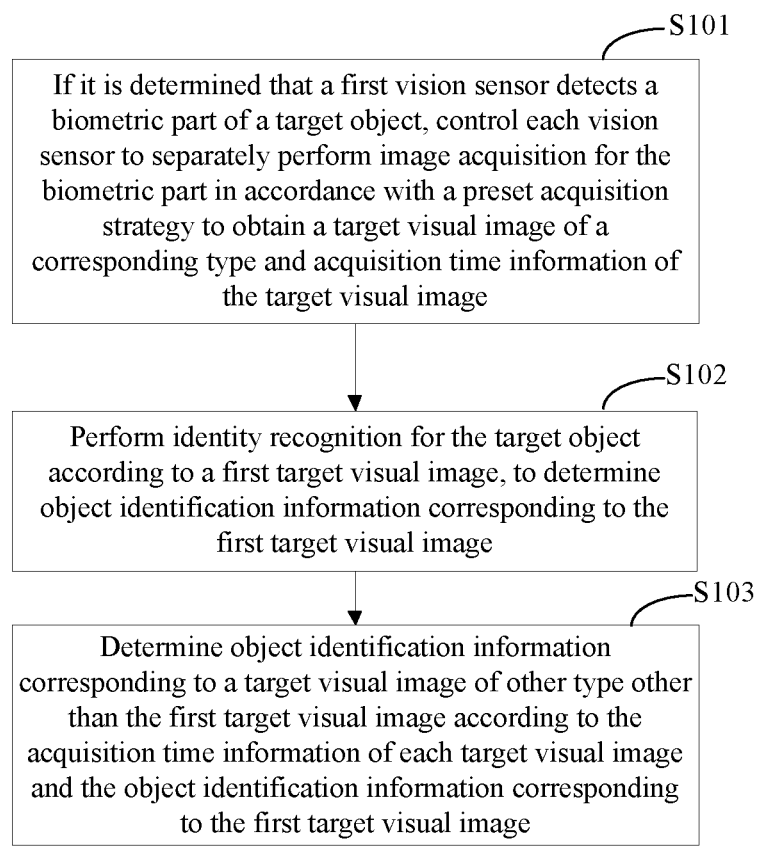
FIG. 2 is a schematic flowchart of a method for processing multimodal images provided according to a first embodiment of the present application.

FIG. 2 is a schematic flowchart of a method for processing multimodal images provided according to a first embodiment of the present application. As shown in FIG. 2, an executive entity of the embodiment of the present application is an apparatus for processing multimodal images. The apparatus for processing multimodal images can be integrated in an electronic device. The multimodal images are acquired by multiple types of vision sensors, and the multiple types of vision sensors are disposed in a first preset identity recognition scenario. The method for processing multimodal images provided by this embodiment includes the following steps.

Step 101: if it is determined that a first vision sensor detects a biometric part of a target object, control each vision sensor to separately perform image acquisition for the biometric part in accordance with a preset acquisition strategy to obtain a target visual image of a corresponding type and acquisition time information of the target visual image.

In this embodiment, the first preset identity recognition scenario may be an identity recognition scenario such as an access control scenario, a security scenario. The multiple types of vision sensors can be disposed on an apparatus such as an access control door or a gate machine. The first vision sensor is an original vision sensor in the first preset identity recognition scenario, for example, may be a visible light vision sensor. Other types of vision sensors other than the first vision sensor may be an NIR vision sensor, a lidar and so on.

In this embodiment, the electronic device establishes communication with multiple types of vision sensors. Specific communication modes may be: a global system of mobile communication (GSM), a code division multiple access (CDMA) system, a wideband code division multiple access (WCDMA) system, a time division-synchronous code division multiple access (TD-SCDMA) system, a Long Term Evolution (LTE) system and 5G etc. It can be understood that the communication mode between the electronic device and the multiple types of vision sensors may also be a wireless communication mode. The wireless communication mode may be a zigbee communication, Bluetooth (BLE) communication, or mobile hotspot wifi communication and so on.

Specifically, in this embodiment, when the target object needed to be performed multimodal image acquisition appears within the field of view of the first vision sensor, the first vision sensor detects the biometrics part of the target object. If the biometrics part of the target object is detected, detection prompt information can be sent to the electronic device. The electronic device determines, according to the detection prompt information, that the biometric part of the target object is detected by the first vision sensor. Then each vision sensor is controlled to separately perform image acquisition for the biometric part in accordance with the preset acquisition strategy. Each type of vision sensor acquires the target visual image of the corresponding type and obtains the acquisition time information of the target visual image.

The biometric part can be preset, such as a human face, palm print, fingerprint or iris, etc.

The acquisition time information of the target visual image corresponding to each type of vision sensor can include a start time and an end time of the acquisition.

In this embodiment, optionally, a manner of controlling each vision sensor to separately perform image acquisition for the biometric part in accordance with the preset acquisition strategy may be: controlling the vision sensors to simultaneously perform image acquisition for the biometric part once; or, optionally, after the vision sensors completes simultaneous image acquisition for the biometric part once, controlling the vision sensors to simultaneously perform image acquisition for the biometric part for a second time, until reaching a preset number of times of acquisitions.

It should be noted that the manner of controlling each vision sensor to separately perform image acquisition for the biometric part in accordance with the preset acquisition strategy may also be other manners, which is not limited in this embodiment.

Step 102: perform identity recognition for the target object according to a first target visual image to determine object identification information corresponding to the first target visual image.

In this embodiment, an image which is acquired by the first vision sensor and includes the biological part of the target object is the first target visual image.

Specifically, in this embodiment, a preset recognition model can be used to perform feature extraction and recognition for the first target visual image, and the object identification information of the target object corresponding to the first target visual image is output through the preset recognition model. Or, identity recognition for the target object may also be performed according to the first target visual image in other manners, to determine the object identification information corresponding to the first target visual image, which is not limited in this embodiment.

The object identification information may be one or more of a name, an identity card number, a mobile phone number, and a mailbox of the target object, so as to determine the unique identity information of the target object through the object identification information.

Step 103: determine object identification information corresponding to a target visual image of other type other than the first target visual image according to the acquisition time information of each target visual image and the object identification information corresponding to the first target visual image.

In this embodiment, the object identification information corresponding to the first target vision sensor is obtained, and the corresponding acquisition time information is obtained. The acquisition time information of the target visual image acquired by other type of vision sensor can be compared with the acquisition time information corresponding to the first target vision sensor. If it is determined according to a comparison result that the target visual image acquired by other type of vision sensor and the first target visual image acquired by the first target vision sensor are different types of visual images corresponding to the same target object, the object identification information corresponding to the first target visual image is determined to be the object identification information corresponding to the target visual image of other type.

In the method for processing multimodal images provided in this embodiment, if it is determined that the first vision sensor detects the biometric part of the target object, each vision sensor is controlled to separately perform image acquisition for the biometric part in accordance with the preset acquisition strategy to obtain the target visual image of the corresponding type and the acquisition time information of the target visual image; identity recognition is performed for the target object according to the first target visual image to determine the object identification information corresponding to the first target visual image; and the object identification information corresponding to the target visual image of other type other than the first target visual image is determined according to the acquisition time information of each target visual image and the object identification information corresponding to the first target visual image. Since the target visual image acquired by the original vision sensor in the identity recognition scenario can be used to perform recognition for the target object, and time of acquiring the corresponding target visual images among multiple vision sensors is associated, the object identification information corresponding to the target visual image of other type can be determined through the acquisition time information of each target visual image. Automatic acquisition of multimodal images and determination of object identification are realized. The efficiency of multimodal image processing is improved, and the cost of acquisition and processing is reduced.

Embodiment 2

Figure 3:
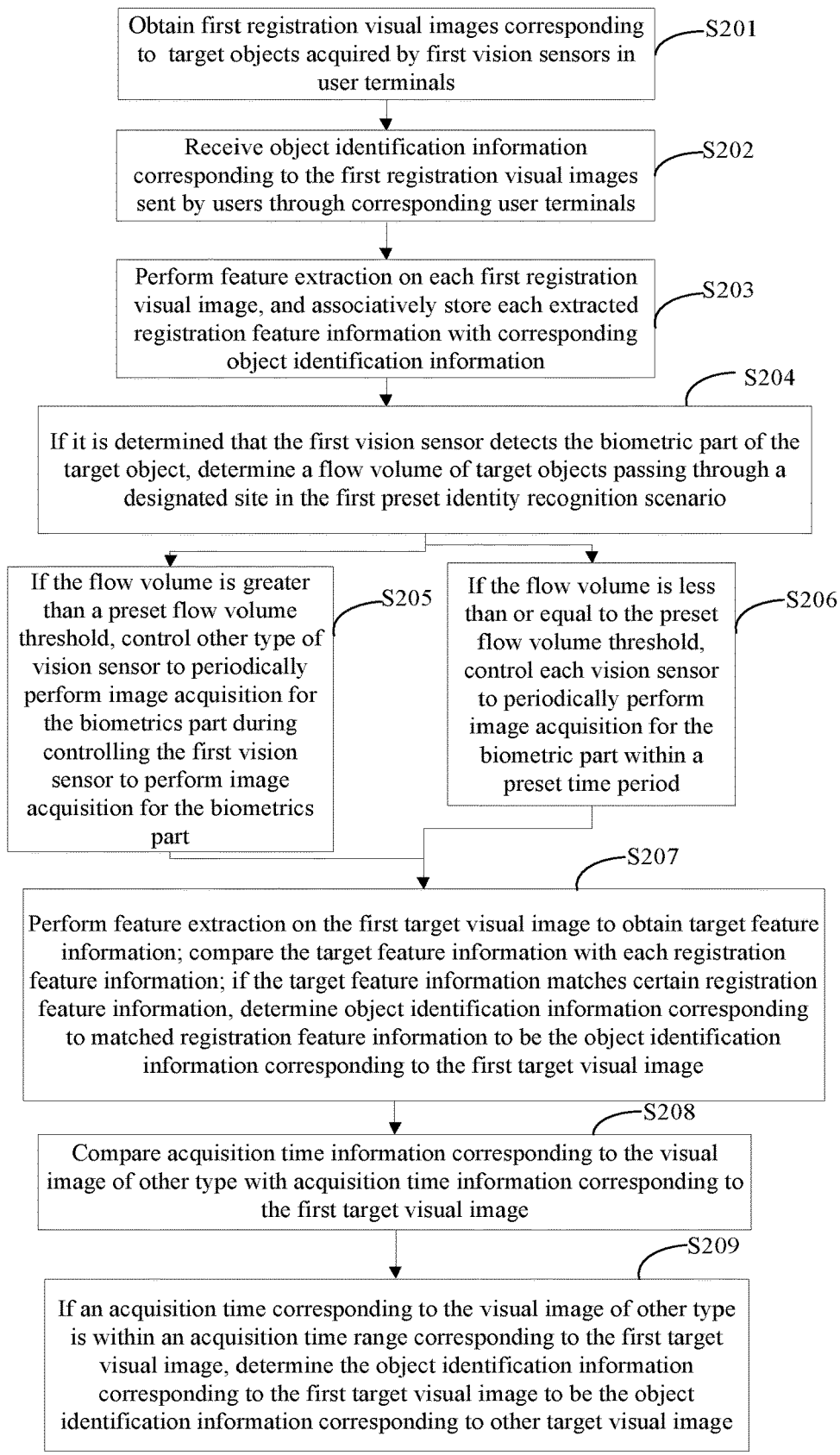
FIG. 3 is a schematic flowchart of a method for processing multimodal images provided according to a second embodiment of the present application.

FIG. 3 is a schematic flowchart of a method for processing multimodal images provided according to a second embodiment of the present application. As shown in FIG. 3, the method for processing multimodal images provided in this embodiment is further refinement on steps 101 to 103 on the basis of the method for processing multimodal images provided in the first embodiment, and further includes steps of: obtaining first registration visual images corresponding to target objects acquired by first vision sensors in user terminals; receiving object identification information corresponding to the first registration visual images sent by users through corresponding user terminals; performing feature extraction on each first registration visual image and associatively store each extracted registration feature information with corresponding object identification information. In this embodiment, the first vision sensor is a visible light vision sensor, and other types of sensors are an NIR vision sensor and a lidar. The method for processing multimodal images provided in this embodiment includes the following steps.

Step 201: obtain first registration visual images corresponding to target objects acquired by first vision sensors in user terminals.

Specifically, in this embodiment, the electronic device determines user terminals of all target objects in the first preset identity recognition scenario according to the first preset identity recognition scenario, and can send image acquisition requests to the user terminals. The user terminals control, according to the image acquisition requests, the first vision sensors to acquire visual images of corresponding target objects. The visual images are the first registration visual images.

Optionally, in this embodiment, the first vision sensor is a visible light vision sensor, such as a photographing camera on the user terminal.

The first registration visual image includes the biometrics part of the target object.

Optionally, in this embodiment, the biometric part is a human face, and the first registration visual image is an RGB human face image acquired by the first vision sensor.

Step 202: receive object identification information corresponding to the first registration visual images sent by users through corresponding user terminals.

Specifically, in this embodiment, acquisition requests of object identification information can be sent to the user terminals, so that the user terminals display input windows of object identification information on screens according to the acquisition requests of object identification information. The electronic device receives object identification information inputted by the users through the input windows of object identification information.

Step 203: perform feature extraction on each first registration visual image and associatively store each extracted registration feature information with corresponding object identification information.

Specifically, in this embodiment, a feature extraction algorithm is used to perform feature extraction on the biometric part in the first registration visual image of each target object, for example, perform feature extraction on a human face in the first registration visual image. The extracted feature information, as the registration feature information, is stored associatively with the corresponding object identification information, and specifically, can be stored associatively in a database.

Step 204: if it is determined that the first vision sensor detects the biometric part of the target object, determine a flow volume of target objects passing through a designated site in the first preset identity recognition scenario.

In this embodiment, step 204 to step 206 are an optional implementation of step 101 in Embodiment 1.

Specifically, in this embodiment, after the electronic device determines that the first vision sensor detects the biometrics part of the target object, the electronic device determines the flow volume of target objects passing through the designated site in the first preset identity recognition scenario.

In this embodiment, the determination of the flow volume of target objects passing through the designated site in the first preset identity recognition scenario is exemplarily explained. For example, the target objects are residents of a community, and the designated site is an entrance of the community. The electronic device determines a flow volume of the residents passing through the entrance of the community after determining that the first vision sensor detects a biometrics part of a target object.

Step 205: if the flow volume is greater than a preset flow volume threshold, control other type of vision sensor to periodically perform image acquisition for the biometrics part during controlling the first vision sensor to perform image acquisition for the biometrics part.

In this embodiment, the determined flow volume is compared with the preset flow volume threshold. If the determined flow volume is greater than the preset flow volume threshold, it means that the flow volume is relatively large, and identity recognition of each target object needs to be quickly done to avoid congestion. Before performing identity recognition, the first vision sensor is a visible light vision sensor and the time for it to acquire the first target visual image is relatively long, while the time for other type of vision sensor to acquire the corresponding target vision image is relatively short. Thus, other type of vision sensor is controlled to periodically perform image acquisition for the biometric part during controlling the first vision sensor to perform image acquisition for the biometric part. Other type of vision sensor can acquire multiple target visual images of the target object. Since the target object will move slightly during the image acquisition of the target object, the multiple target visual images can display the biometric part with different angles.

Step 206: if the flow volume is less than or equal to the preset flow volume threshold, control each vision sensor to periodically perform image acquisition for the biometric part within a preset time period.

In this embodiment, the determined flow volume is compared with the preset flow volume threshold. If the determined flow volume is less than or equal to the preset flow volume threshold, it means that the flow volume is relatively small, and the acquisition of multimodal images for each target object can be performed for a long time. Each vision sensor is controlled to periodically perform image acquisition for the biometric part within the preset time period. The preset time period is longer than the time of performing image acquisition for the biometric part by the first vision sensor, and thus each vision sensor can acquire multiple corresponding target visual images within the preset time period, and each target visual image can display the biometric part with different angles.

Step 207: perform feature extraction on the first target visual image to obtain target feature information; compare the target feature information with each registration feature information; if the target feature information matches certain registration feature information, determine object identification information corresponding to matched registration feature information to be the object identification information corresponding to the first target visual image.

In this embodiment, step 207 is an optional implementation of step 102 in Embodiment 1.

Specifically, the same feature extraction algorithm used when registering the target objects is used to perform feature extraction on the first target visual image, and the feature information is obtained to serve as the target feature information. Then the target feature information is compared with each registration feature information stored in the database using a preset matching algorithm, and whether the target feature information matches the each registration feature information is determined according to a matching result. If it is determined that the target feature information matches certain registration feature information, the object identification information associatively stored with the matched registration feature information is obtained, and the associatively stored object identification information is determined to be the object identification information corresponding to the first target visual image.

Step 208: compare acquisition time information corresponding to the visual image of other type with acquisition time information corresponding to the first target visual image.

Step 209: if an acquisition time corresponding to the visual image of other type is within an acquisition time range corresponding to the first target visual image, determine the object identification information corresponding to the first target visual image to be the object identification information corresponding to other target visual image.

In this embodiment, step 208 to step 209 are an optional implementation of step 103 in Embodiment 1.

In this embodiment, the acquisition time information corresponding to the visual image of other type includes a start time and an end time of the acquisition. The acquisition time information corresponding to the first target visual image also includes a start time and an end time of the acquisition.

Specifically, in this embodiment, the acquisition time information corresponding to the visual image of other type is compared with the acquisition time information corresponding to the first target visual image, and whether the acquisition time corresponding to the visual image of other type falls within the acquisition time range corresponding to the first target visual image is judged. If so, it means that the acquired target visual image of other type and the acquired first target visual image are visual images corresponding to the same target object, then the object identification information corresponding to the first target visual image is determined to be the object identification information corresponding to other target visual image. If not, the target object corresponding to the target visual image of other type cannot be determined accurately, and the target visual image of other type can be deleted.

In the method for processing multimodal images provided in this embodiment, before performing identity recognition for the target object according to the first target visual image to determine the object identification information corresponding to the first target visual image, the first registration visual images corresponding to the target objects acquired by the first vision sensors in the user terminals are obtained; the object identification information corresponding to the first registration visual images sent by the users through corresponding user terminals is received; feature extraction is performed on each first registration visual image, and each extracted registration feature information is associatively stored with the corresponding object identification information; and when performing identity recognition for the target object according to the first target visual image to determine the object identification information corresponding to the first target visual image, feature extraction is performed on the first target visual image to obtain the target feature information; the target feature information is compared with each registration feature information; if the target feature information matches certain registration feature information, the object identification information corresponding to the matched registration feature information is determined to be the object identification information corresponding to the first target visual image. Since each extracted registration feature information is stored associatively with corresponding object identification information in advance, after acquiring the first target visual image, identity recognition of the target object corresponding to the first target visual image can be performed fast and accurately by way of performing matching on the image feature information.

In the method for processing multimodal images provided in this embodiment, when each vision sensor is controlled to separately perform image acquisition for the biometric part in accordance with the preset acquisition strategy to obtain the target visual image of the corresponding type and the acquisition time information of the target visual image, the flow volume of the target objects passing through the designated site in the first preset identity recognition scenario is determined; if the flow volume is greater than the preset flow volume threshold, other type of vision sensor is controlled to periodically perform image acquisition for the biometrics part during controlling the first vision sensor to perform image acquisition for the biometric part; if the flow volume is less than or equal to the preset flow volume threshold, each vision sensor is controlled to periodically perform image acquisition for the biometric part within the preset time period, which can acquire the multimodal images to the maximum extent in a case where performing identity recognition for the target object without causing congestion is ensured, so that acquired multimodal images are more abundant.

Embodiment 3

Figure 4:
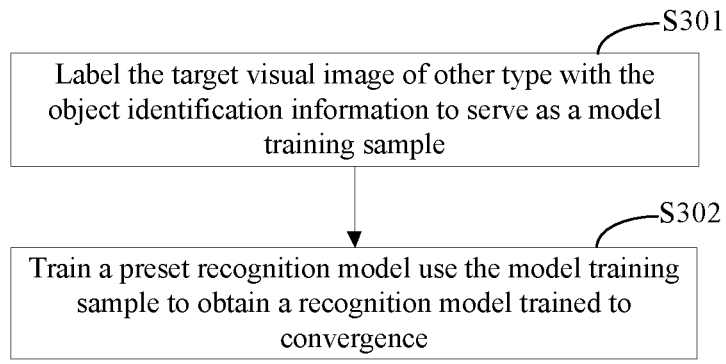
FIG. 4 is a schematic flowchart of a method for processing multimodal images provided according to a third embodiment of the present application.

FIG. 4 is a schematic flowchart of a method for processing multimodal images provided according to a third embodiment of the present application. As shown in FIG. 4, on the basis of the method for processing multimodal images provided in the first embodiment or the second embodiment of the present application, the method for processing multimodal images provided in this embodiment further includes steps of training a preset recognition model after determining the object identification information corresponding to the target visual image of other type other than the first target visual image according to the acquisition time information of each target visual image and the object identification information corresponding to the first target visual image. The method for processing multimodal images provided in this embodiment further includes the following steps.

Step 301: label the target visual image of other type with the object identification information to serve as a model training sample.

In this embodiment, after determining the object identification information corresponding to the target visual image of each other type, the target visual image of each other type can be stored associatively with the corresponding object identification information, for example stored in a database. Then, the target visual image of each other type and the corresponding object identification information can be obtained from the database. The target visual image of each other type is labeled with the object identification information, and the target visual image of each other type after being labeled with the object identification information can be served as a training sample of a corresponding preset recognition model.

Exemplarily, the target visual image of other type may include: an NIR target visual image and a depth target visual image. The NIR target visual image of each target object is labeled with object identification information to serve as a training sample of a corresponding preset NIR image recognition model. The depth target visual image of each target object is labeled with object identification information to serve as a training sample of a corresponding preset depth image recognition model.

Step 302: train a preset recognition model using the model training sample to obtain a recognition model trained to convergence.

Specifically, in this embodiment, the preset NIR image recognition model is trained using training samples of the preset NIR image recognition model, and parameters in the preset NIR image recognition model are adjusted to determine whether a preset convergence condition is reached. If the preset convergence condition is reached, the NIR image recognition model which meets the preset convergence condition is determined to be the NIR image recognition model trained to convergence.

In the same way, the preset depth image recognition model is trained using training samples of the preset depth image recognition model, and parameters in the preset depth image recognition model are adjusted to determine whether a preset convergence condition is reached. If the preset convergence condition is reached, the depth image recognition model which meets the preset convergence condition is determined to be the depth image recognition model trained to convergence.

The NIR image recognition model trained to convergence and/or the depth image recognition model trained to convergence may be a deep learning model, a machine learning model, etc.

It can be understood that the recognition model trained to convergence is stored after determining the recognition model trained to convergence.

After determining the object identification information corresponding to the target visual image of other type other than the first target visual image according to the acquisition time information of each target visual image and the object identification information corresponding to the first target visual image, the method for processing multimodal images provided in this embodiment further includes: labeling the target visual image of other type with the object identification information to serve as the model training sample; the preset recognition model is trained using the model training sample to obtain the recognition model trained to convergence. The recognition model trained to convergence which corresponds to the visual image of other type can be obtained to prepare for the use of the visual image of other type to perform identity recognition.

Embodiment 4

Figure 5:
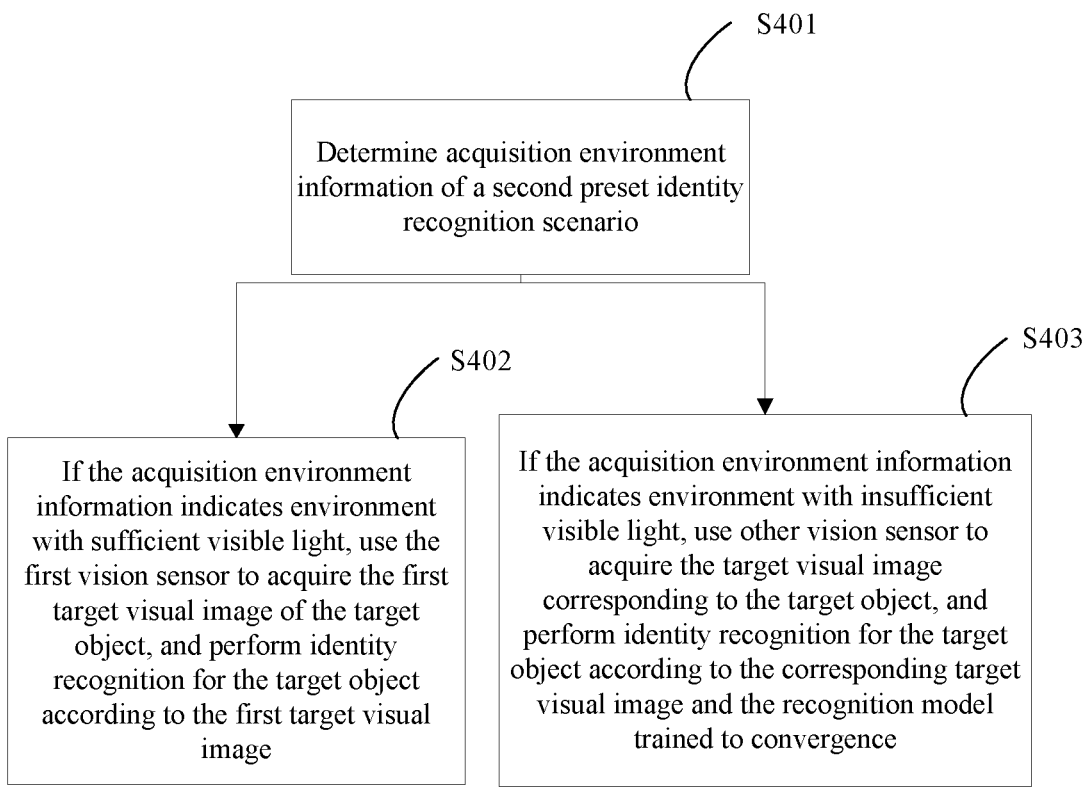
FIG. 5 is a schematic flowchart of a method for processing multimodal images provided according to a fourth embodiment of the present application.
Figure 6:
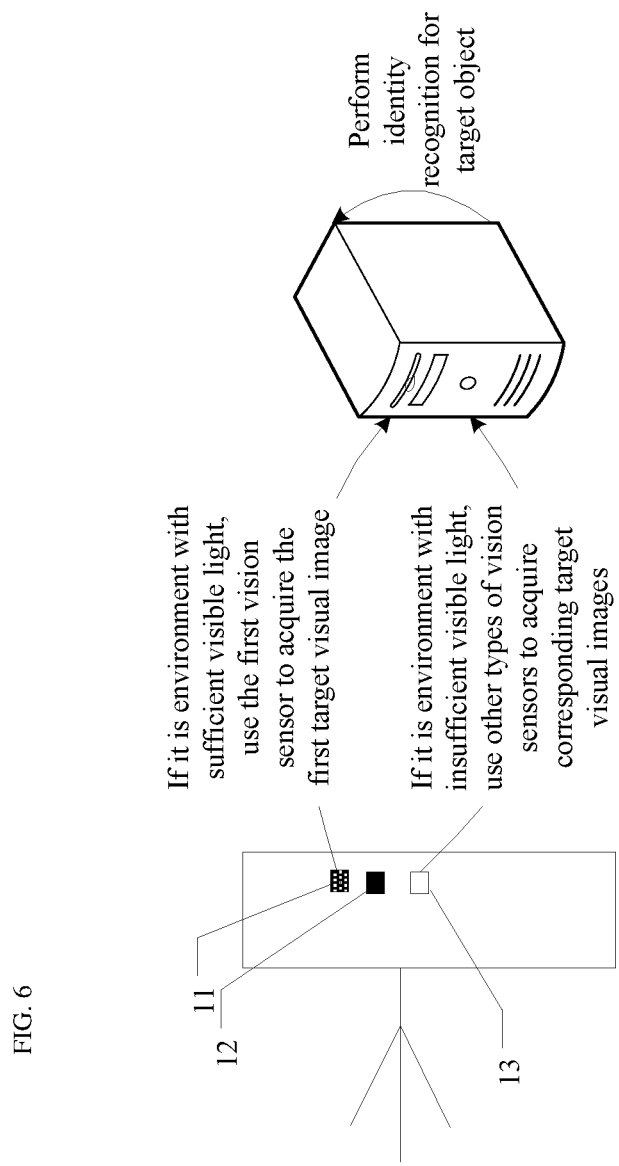
FIG. 6 is an application scenario diagram of a method for processing multimodal images provided according to a fifth embodiment of the present application.

FIG. 5 is a schematic flowchart of a method for processing multimodal images provided according to a fourth embodiment of the present application. FIG. 6 is an application scenario diagram of a method for processing multimodal images provided according to a fifth embodiment of the present application. As shown in FIGS. 5 and 6, on the basis of the method for processing multimodal images provided in the third embodiment of the present application, the method for processing multimodal images provided in this embodiment further includes steps of using a corresponding vision sensor to perform image acquisition and performing identity recognition for the target object. The method for processing multimodal images provided in this embodiment further includes the following steps.

Step 401: determine acquisition environment information of a second preset identity recognition scenario.

In this embodiment, target object(s) in the second preset identity recognition scenario may be part or all of target objects in the first preset recognition scenario. For example, the first preset identification scenario is a scenario of community access control, and the second preset identification scenario may be a scenario of apartment building access control.

In this embodiment, the acquisition environment information may be a scenario with sufficient visible light, or may be a scenario with insufficient visible light.

Specifically, in this embodiment, a visible light sensor may be used to acquire the acquisition environment information of the second preset identity recognition scenario, which is then sent to the electronic device. Or current acquisition time information and current acquisition weather information can be obtained, and the acquisition environment information of the second preset identity recognition scenario can be determined according to the current acquisition time information and the current acquisition weather information, which is not limited in this embodiment.

Step 402: if the acquisition environment information indicates environment with sufficient visible light, use the first vision sensor to acquire the first target visual image of the target object, and perform identity recognition for the target object according to the first target visual image.

The first vision sensor is a visible light vision sensor.

In this embodiment, if it is determined that the acquisition environment information indicates the environment with sufficient visible light, which means that the visible light vision sensor is suitable for image acquisition for the biometric part of the target object, then the visible light vision sensor is used to perform image acquisition for the biometric part of the target object to obtain the first target visual image, and identity recognition is performed for the target object according to the first target visual image.

In this embodiment, the manner of performing identity recognition for the target object according to the first target visual image is similar to the corresponding manner in Embodiment 1 or Embodiment 2, which will not be repeated here.

Step 403: if the acquisition environment information indicates environment with insufficient visible light, use other vision sensor to acquire the target visual image corresponding to the target object, and perform identity recognition for the target object according to the corresponding target visual image and the recognition model trained to convergence.

In this embodiment, if it is determined that the acquisition environmental information is the environment with insufficient visible light, it means that it is not suitable for the visible light vision sensor to perform image acquisition for the biometric part of the target object, while it is suitable for other types of vision sensors to perform image acquisition for the biometric part of the target object. For example, other type of vision sensor may be an NIR vision sensor or a depth vision sensor. Then, other type of vision sensor is used to perform acquisition for the biometrics part of the target object, the corresponding target visual image is obtained, and identity recognition is performed for the target object according to the corresponding target visual image.

When the identity recognition is performed for the target object according to the corresponding target visual image, the target visual image is inputted into the recognition model trained to convergence. The recognition model trained to convergence performs feature extraction on the target visual image, performs recognition on the target object, and outputs the object identification information of the target object corresponding to the target visual image.

In the method for processing multimodal images provided in this embodiment, the acquisition environment information of the second preset identity recognition scenario is determined; if the acquisition environment information indicates the environment with sufficient visible light, the first vision sensor is used to acquire the first target visual image of the target object, and the identity recognition for the target object is performed according to the first target visual image; if the acquisition environment information indicates the environment with insufficient visible light, other vision sensor is used to acquire the target visual image corresponding to the target object, and identity recognition is performed for the target object according to the corresponding target visual image and the recognition model trained to convergence. In the second preset identity recognition scenario, according to the acquisition environment information of the second preset identity recognition scenario, the most suitable vision sensor is used to perform image acquisition and identity recognition for the target object, which can accurately recognize the target object under different acquisition environments.

Embodiment 5

Figure 7:
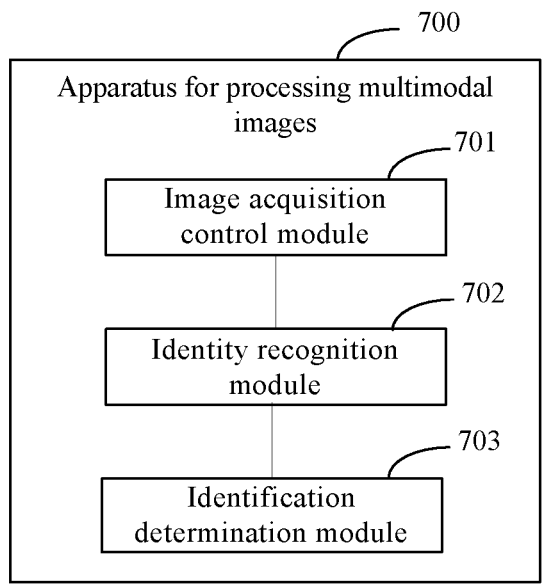
FIG. 7 is a schematic structural diagram of an apparatus for processing multimodal images provided according to a sixth embodiment of the present application.

FIG. 7 is a schematic structural diagram of an apparatus for processing multimodal images provided according to a sixth embodiment of the present application. As shown in FIG. 7, in the apparatus for processing multimodal images provided in this embodiment, multimodal images are acquired using multiple types of vision sensors, and the multiple types of vision sensors are disposed in a first preset identity recognition scenario. The apparatus for processing multimodal images 700 includes: an image acquisition control module 701, an identity recognition module 702, and an identification determination module 703.

The image acquisition control module 701 is configured to, if it is determined that a first vision sensor detects a biometric part of a target object, control each vision sensor to separately perform image acquisition for the biometric part in accordance with a preset acquisition strategy to obtain a target visual image of a corresponding type and acquisition time information of the target visual image. The identity recognition module 702 is configured to perform identity recognition for the target object according to the first target visual image to determine object identification information corresponding to the first target visual image. The identification determination module 703 is configured to determine object identification information corresponding to a target visual image of other type other than the first target visual image according to the acquisition time information of each target visual image and the object identification information corresponding to the first target visual image.

The apparatus for processing multimodal images provided in this embodiment can carry out the technical solution of the method embodiment shown in FIG. 2, and the implementation principle and the technical effect thereof are similar to the method embodiment shown in FIG. 2, which will not be repeated here.

Embodiment 6

Figure 8:
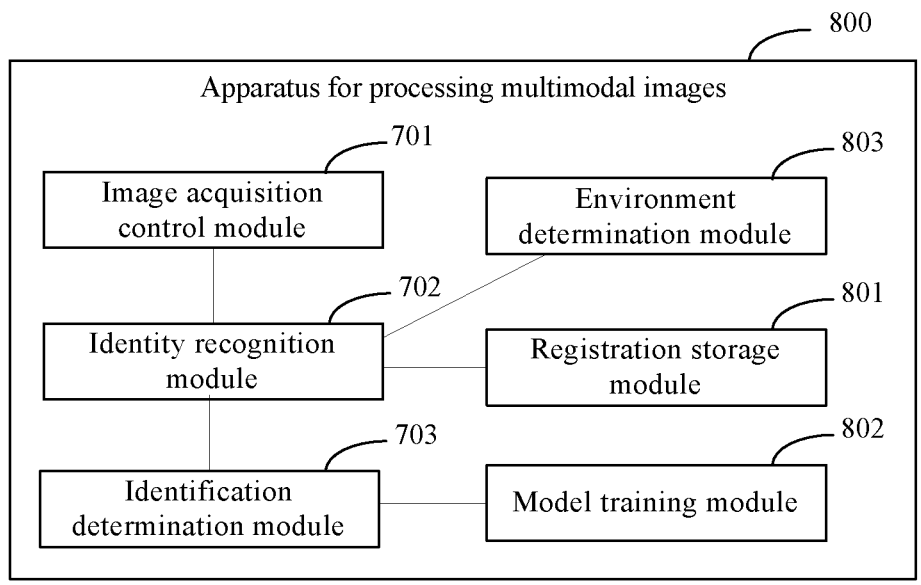
FIG. 8 is a schematic structural diagram of an apparatus for processing multimodal images provided according to a seventh embodiment of the present application.

FIG. 8 is a schematic structural diagram of an apparatus for processing multimodal images provided according to a seventh embodiment of the present application. As shown in FIG. 8, on the basis of the apparatus for processing multimodal images 700 provided in Embodiment 5 of the present application, the apparatus for processing multimodal images 800 provided in this embodiment further includes: a registration storage module 801, a model training module 802, and an environment determination module 803.

Optionally, the first target visual image is an RGB image.

The target visual image of other type includes any one or more of the following images:

an NIR image, a depth image and a three-dimensional point cloud image.

Correspondingly, the image acquisition control module 701 is specifically configured to:

determine a flow volume of target objects passing through a designated site in the first preset identity recognition scenario; if the flow volume is greater than the preset flow volume threshold, control other type of vision sensor to periodically perform image acquisition for the biometrics part during controlling the first vision sensor to perform image acquisition for the biometrics part; if the flow volume is less than or equal to the preset flow volume threshold, control each vision sensor to periodically perform image acquisition for the biometric part within a preset time period.

The biometric part of the target object includes any of the following parts:

a facial part, an iris part, a palm print part, and a fingerprint part.

Optionally, registration storage module 801 is configured to:

acquire first registration visual images corresponding to target objects acquired by first vision sensors in user terminals; receive object identification information corresponding to the first registration visual images sent by users through corresponding user terminals; perform feature extraction on each first registration visual image and associatively store each extracted registration feature information with corresponding object identification information.

Optionally, the identity recognition module 702 is specifically configured to:

perform feature extraction on the first target visual image to obtain target feature information; compare the target feature information with each registration feature information; if the target feature information matches certain registration feature information, determine object identification information corresponding to matched registration feature information to be the object identification information corresponding to the first target visual image.

Optionally, the identification determination module 703 is specifically configured to:

compare acquisition time information corresponding to the target visual image of other type with acquisition time information corresponding to the first target visual image; if the acquisition time corresponding to the target visual image of other type is within an acquisition time range corresponding to the first target visual image, determine the object identification information corresponding to the first target visual image to be the object identification information corresponding to other target visual image.

Optionally, the model training module 802 is configured to:

label the target visual image of other type with object identification information to serve as a model training sample; train a preset recognition model using the model training sample to obtain a recognition model trained to convergence.

Optionally, the multiple types of vision sensors are disposed in a second preset identity recognition scenario. The environment determination module 803 is configured to determine acquisition environment information of the second preset identity recognition scenario. The identity recognition module is further configured to: if the acquisition environment information indicates environment with sufficient visible light, use the first vision sensor to acquire the first target visual image of the target object, and perform identity recognition for the target object according to the first target visual image; if the acquisition environment information indicates environment with insufficient visible light, use other vision sensor to acquire the target visual image corresponding to the target object, and perform identity recognition for the target object according to the corresponding target visual image and the recognition model trained to convergence.

The apparatus for processing multimodal images provided in this embodiment can carry out the technical solution of the method embodiments shown in FIGS. 3 to 5, and the implementation principle and the technical effect thereof are similar to the method embodiments shown in FIGS. 3 to 5, which will not be repeated here.

According to the embodiments of the present application, the present application also provides an electronic device and a non-transitory computer-readable storage medium storing computer instructions thereon.

Figure 9:
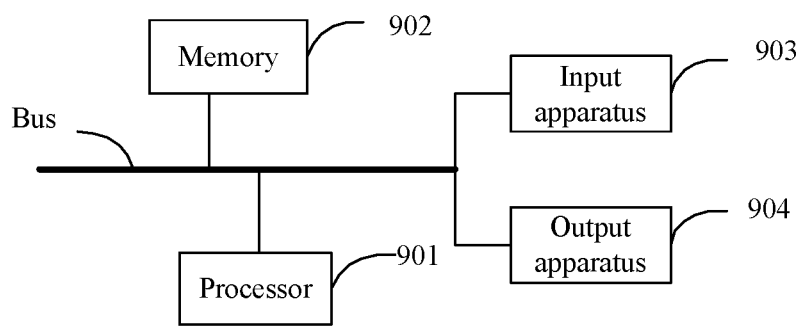
FIG. 9 is a block diagram of an electronic device for implementing a method for processing multimodal images of an embodiment of the present application.

As shown in FIG. 9, FIG. 9 is a block diagram of an electronic device for a method for processing multimodal images according to an embodiment of the present application. The electronic device is intended to represent various forms of digital computers, such as laptop computers, desktop computers, workstations, personal digital assistants, servers, blade servers, large computers, and other computers as appropriate. The electronic device can also represent various forms of mobile apparatuses, such as personal digital assistants, cellular phones, smart phones, wearable devices, and other similar computing apparatuses. The shown components, their connections and relationships, and their functions are merely examples, and are not intended to limit the implementation of the present application described and/or claimed herein.

As shown in FIG. 9, the electronic device includes: one or more processors 901, a memory 902, and interfaces for connecting components, including a high-speed interface and a low-speed interface. The components are connected to each other using different buses, and can be installed on a common motherboard or installed in other ways as required. The processor may process instructions executed in the electronic device, including instructions stored in or on the memory to display graphical information of the GUI on an external input/output apparatus (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). One processor 901 is taken as an example in FIG. 9.

The memory 902 is a non-transitory computer-readable storage medium provided in the present application. The memory stores instructions executable by at least one processor to enable the at least one processor to execute the method for processing multimodal images provided in the present application. The non-transitory computer-readable storage medium of the present application stores computer instructions, and the computer instructions are used to cause a computer to execute the method for processing multimodal images provided in the present application.

As a non-transitory computer-readable storage medium, the memory 902 can be configured to store non-transitory software programs, non-transitory computer-executable programs and modules, such as program instructions/modules corresponding to a method for processing multimodal images in an embodiment of the present application (for example, the image acquisition control module 701, the identity recognition module and the identification determination module 702 shown in FIG. 7). The processor 901 executes multiple types of functional applications and data processing of a server by running non-transient software programs, instructions and modules stored in the memory 902, that is, implements the method for processing multimodal images in the foregoing method embodiments.

The memory 902 may include a program storage region and a data storage region, where the program storage region may store an operating system and an application program required by at least one function; the data storage region may store data created according to the usage of the electronic device for the method for processing multimodal images. In addition, the memory 902 may include a high-speed random access memory, and may also include a non-transitory memory, such as at least one magnetic disk storage device, a flash memory device or other non-transitory solid-state storage device. In some embodiments, the memory 902 may optionally include memories remotely provided with respect to the processor 901, and these remote memories can be connected to the electronic device through a network. Examples of the aforementioned network include, but are not limited to, the Internet, an Intranet, a local area network, a mobile communication network, and combinations thereof.

The electronic device for the method for processing multimodal images may further include: an input apparatus 903 and an output apparatus 904. The processor 901, the memory 902, the input apparatus 903, and the output apparatus 904 may be connected through a bus or in other ways. A connection through a bus is taken as an example in FIG. 9.

The input apparatus 903 can receive input digital or character information, and generate key signal inputs related to user settings and function control of the electronic device, such as a touch screen, a keypad, a mouse, a track pad, a touch pad, an indicator stick, one or more mouse buttons, a trackball, a joystick and other input apparatus. The output apparatus 904 may include a display device, an auxiliary lighting device (for example, an LED), a tactile feedback apparatus (for example, a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein can be implemented in a digital electronic circuit system, an integrated circuit system, an application specific ASIC (application specific integrated circuit), computer hardware, firmware, software, and/or combinations thereof. These embodiments may include: being implemented in one or more computer programs, the one or more computer programs may be executed and/or interpreted on a programmable system including at least one programmable processor. The programmable processor may be a dedicated or universal programmable processor, and can receive data and instructions from a storage system, at least one input apparatus, and at least one output apparatus, and transmit data and instructions to the storage system, the at least one input apparatus and the at least one output apparatus.

These computer programs (also referred to as programs, software, software applications, or codes) include machine instructions for a programmable processor, and can be implemented using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (for example, a magnetic disk, an optical disk, a memory, a programmable logic apparatus (PLD)), including machine-readable media that receive machine instructions as machine-readable signals. The term "machine-readable signal" refers to any signal used to provide machine instructions and/or data to a programmable processor.

In order to provide interaction with a user, the systems and techniques described herein can be implemented on a computer, which includes: a display apparatus for displaying information to the user (for example, a CRT (cathode ray tube) or LCD (liquid crystal display) monitor)); and a keyboard and a pointing apparatus (for example, a mouse or a trackball) through which the user can provide inputs to the computer. Other types of apparatuses can also be used to provide interaction with the user; for example, a feedback provided to the user may be any form of sensory feedback (for example, visual feedback, auditory feedback, or tactile feedback); and can receive inputs from the user in any form (including acoustic inputs, voice inputs, or tactile inputs).

The systems and techniques described herein can be implemented in a computing system that includes background components (for example, as a data server), or a computing system that includes middleware components (for example, an application server), or a computing system that includes front-end components (for example, a user computer with a graphical user interface or web browser, through which the user can interact with the implementation of the systems and techniques described herein), or a computing system that includes any combination of such background components, middleware components or front-end components. Components of a system can be connected to each other through any form or medium of digital data communication (for example, a communication network). Example of the communication network includes: a local area network (LAN), a wide area network (WAN), and the Internet.

The computer system can include a client and a server. The client and server are typically far away from each other and usually interact through a communication network. A relationship between the client and the server is generated through computer programs running on the corresponding computers and having a client-server relationship with each other.

The present application provides a method for processing multimodal images, an apparatus, a device and a storage medium, and relates to the technical fields of computer vision and deep learning in artificial intelligence. According to the technical solutions of the embodiments of the present application, since a target visual image acquired by an original vision sensor in the identity recognition scenario can be used to perform recognition for the target object, and time of acquiring corresponding target visual image among multiple vision sensors is associated, the object identification information corresponding to the target visual image of other type can be determined through the acquisition time information of each target visual image. Automatic acquisition of multimodal images and determination of object identification are realized. The efficiency of multimodal image processing is improved, and the cost of acquisition and processing is reduced.

It should be understood that the various forms of processes shown above can be used to reorder, add or delete steps. For example, the steps described in the present application can be performed in parallel, sequentially, or in a different order, as long as the desired result of the technical solutions disclosed in the present application can be achieved, which is not limited herein.

The foregoing specific implementations do not constitute a limitation on the protection scope of the present application. Those skilled in the art should understand that various modifications, combinations, sub-combinations and substitutions can be made according to design requirements and other factors. Any amendments, equivalent substitutions and improvements made within the spirit and principle of the present application shall be included in the protection scope of the present application.

What is claimed is:

1. A method for processing multimodal images, wherein the multimodal images are acquired using multiple types of vision sensors, and the multiple types of vision sensors are disposed in a first preset identity recognition scenario; the method comprises:

if it is determined that a first vision sensor detects a biometric part of a target object, controlling each vision sensor to separately perform image acquisition for the biometric part in accordance with a preset acquisition strategy to obtain a target visual image of a corresponding type and acquisition time information of the target visual image;

performing identity recognition for the target object according to a first target visual image to determine object identification information corresponding to the first target visual image;

determining object identification information corresponding to a target visual image of other type other than the first target visual image according to the acquisition time information of each target visual image and the object identification information corresponding to the first target visual image;

wherein the first target visual image is an RGB image; and the controlling each vision sensor to separately perform image acquisition for the biometric part in accordance with the preset acquisition strategy to obtain the target visual image of the corresponding type and the acquisition time information of the target visual image comprises:

determining a flow volume of target objects passing through a designated site in the first preset identity recognition scenario;

if the flow volume is greater than a preset flow volume threshold, controlling other type of vision sensor to periodically perform image acquisition for the biometric part during controlling the first vision sensor to perform image acquisition for the biometric part;

if the flow volume is less than or equal to the preset flow volume threshold, controlling each vision sensor to periodically perform image acquisition for the biometric part within a preset time period.

2. The method according to claim 1, before performing identity recognition for the target object according to the first target visual image to determine the object identification information corresponding to the first target visual image, comprising:

obtaining first registration visual images corresponding to target objects acquired by first vision sensors in user terminals;

receiving object identification information corresponding to the first registration visual images sent by users through corresponding user terminals;

performing feature extraction on each first registration visual image and associatively storing each extracted registration feature information with corresponding object identification information.

3. The method according to claim 2, wherein the performing identity recognition for the target object according to the first target visual image to determine the object identification information corresponding to the first target visual image, comprises:

performing feature extraction on the first target visual image to obtain target feature information;

comparing the target feature information with each registration feature information;

if the target feature information matches one piece of the registration feature information, determining object identification information corresponding to matched registration feature information to be the object identification information corresponding to the first target visual image.

4. The method according to claim 1, wherein the determining the object identification information corresponding to the target visual image of other type other than the first target visual image according to the acquisition time information of each target visual image and the object identification information corresponding to the first target visual image, comprises:

comparing acquisition time information corresponding to the target visual image of other type with acquisition time information corresponding to the first target visual image;

if an acquisition time corresponding to the target visual image of other type is within an acquisition time range corresponding to the first target visual image, determining the object identification information corresponding to the first target visual image to be the object identification information corresponding to the target visual image of other type.

5. The method according to claim 1, after determining the object identification information corresponding to the target visual image of other type other than the first target visual image according to the acquisition time information of each target visual image and the object identification information corresponding to the first target visual image, further comprising:

labeling the target visual image of other type with the object identification information to serve as a model training sample;

training a preset recognition model using the model training sample to obtain a recognition model trained to convergence.

6. The method according to claim 5, wherein the multiple types of vision sensors are disposed in a second preset identity recognition scenario; the method further comprises:

determining acquisition environment information of the second preset identity recognition scenario;

if the acquisition environment information indicates an environment with sufficient visible light, using the first vision sensor to acquire the first target visual image of the target object, and performing identity recognition for the target object according to the first target visual image;

if the acquisition environment information indicates an environment with insufficient visible light, using other vision sensor to acquire the target visual image corresponding to the target object, and performing identity recognition for the target object according to the corresponding target visual image and the recognition model trained to convergence.

7. The method according to claim 1, wherein the target visual image of other type comprises any one or more of the following images:
an NIR image, a depth image and a three-dimensional point cloud image.

8. The method according to claim 1, wherein the biometric part of the target object comprises any one of the following parts:
a facial part, an iris part, a palm print part, and a fingerprint part.

9. An apparatus for processing multimodal images, wherein the multimodal images are acquired using multiple types of vision sensors, and the multiple types of vision sensors are disposed in a first preset identity recognition scenario; the apparatus comprises:
at least one processor; and
a memory communicatively connected with the at least one processor; wherein,
the memory stores thereon instructions executable by the at least one processor, and the instructions are executed by the at least one processor to enable the at least one processor to:
if it is determined that a first vision sensor detects a biometric part of a target object, control each vision sensor to separately perform image acquisition for the biometric part in accordance with a preset acquisition strategy to obtain a target visual image of a corresponding type and acquisition time information of the target visual image;
perform identity recognition for the target object according to a first target visual image to determine object identification information corresponding to the first target visual image;
determine object identification information corresponding to a target visual image of other type other than the first target visual image according to the acquisition time information of each target visual image and the object identification information corresponding to the first target visual image;
wherein the at least one processor is further enabled to:
compare acquisition time information corresponding to the target visual image of other type with acquisition time information corresponding to the first target visual image;
if an acquisition time corresponding to the target visual image of other type is within an acquisition time range corresponding to the first target visual image, determine the object identification information corresponding to the first target visual image to be the object identification information corresponding to the target visual image of other type.

10. The apparatus according to claim 9, wherein the first target visual image is an RGB image; and
the at least one processor is further enabled to:
determine a flow volume of target objects passing through a designated site in the first preset identity recognition scenario;
if the flow volume is greater than a preset flow volume threshold, control other type of vision sensor to periodically perform image acquisition for the biometric part during controlling the first vision sensor to perform image acquisition for the biometric part;
if the flow volume is less than or equal to the preset flow volume threshold, control each vision sensor to periodically perform image acquisition for the biometric part within a preset time period.

11. The apparatus according to claim 9, wherein the at least one processor is further enabled to:
obtain first registration visual images corresponding to target objects acquired by first vision sensors in user terminals;
receive object identification information corresponding to the first registration visual images sent by users through corresponding user terminals;
perform feature extraction on each first registration visual image and associatively store each extracted registration feature information with corresponding object identification information.

12. The apparatus according to claim 11, wherein the at least one processor is further enabled to:
perform feature extraction on the first target visual image to obtain target feature information;
compare the target feature information with each registration feature information;
if the target feature information matches one piece of the registration feature information, determine object identification information corresponding to matched registration feature information to be the object identification information corresponding to the first target visual image.

13. The apparatus according to claim 9, wherein the at least one processor is further enabled to:
label the target visual image of other type with the object identification information to serve as a model training sample;
train a preset recognition model using the model training sample to obtain a recognition model trained to convergence.

14. The apparatus according to claim 13, wherein the multiple types of vision sensors are disposed in a second preset identity recognition scenario; the at least one processor is further enabled to:
determine acquisition environment information of the second preset identity recognition scenario; and
if the acquisition environment information indicates an environment with sufficient visible light, use the first vision sensor to acquire the first target visual image of the target object, and perform identity recognition for the target object according to the first target visual image;
if the acquisition environment information indicates an environment with insufficient visible light, use other vision sensor to acquire the target visual image corresponding to the target object, and perform identity recognition for the target object according to the corresponding target visual image and the recognition model trained to convergence.

15. The apparatus according to claim 9, wherein the target visual image of other type comprises any one or more of the following images:
an NIR image, a depth image, and a three-dimensional point cloud image.

16. The apparatus according to claim 9, wherein the biometric part of the target object comprises any one of the following parts:
a facial part, an iris part, a palm print part, and a fingerprint part.

17. A non-transitory computer-readable storage medium storing thereon computer instructions which are used to cause a computer to:
   if it is determined that a first vision sensor detects a biometric part of a target object, control each vision sensor to separately perform image acquisition for the biometric part in accordance with a preset acquisition strategy to obtain a target visual image of a corresponding type and acquisition time information of the target visual image;
   perform identity recognition for the target object according to a first target visual image to determine object identification information corresponding to the first target visual image;
   determine object identification information corresponding to a target visual image of other type other than the first target visual image according to the acquisition time information of each target visual image and the object identification information corresponding to the first target visual image;
   wherein the computer instructions are further used to cause the computer to:
   after determining the object identification information corresponding to the target visual image of other type other than the first target visual image according to the acquisition time information of each target visual image and the object identification information corresponding to the first target visual image,
   label the target visual image of other type with the object identification information to serve as a model training sample;
   train a preset recognition model using the model training sample to obtain a recognition model trained to convergence;
   wherein the multiple types of vision sensors are disposed in a second preset identity recognition scenario, and the computer instructions are further used to cause the computer to:
   determine acquisition environment information of the second preset identity recognition scenario; and
   if the acquisition environment information indicates an environment with sufficient visible light, use the first vision sensor to acquire the first target visual image of the target object, and perform identity recognition for the target object according to the first target visual image;
   if the acquisition environment information indicates an environment with insufficient visible light, use other vision sensor to acquire the target visual image corresponding to the target object, and perform identity recognition for the target object according to the corresponding target visual image and the recognition model trained to convergence.

18. The non-transitory computer-readable storage medium according to claim 17, wherein the first target visual image is an RGB image; the instructions are further used to cause the computer to:
   determine a flow volume of target objects passing through a designated site in the first preset identity recognition scenario;
   if the flow volume is greater than a preset flow volume threshold, control other type of vision sensor to periodically perform image acquisition for the biometric part during controlling the first vision sensor to perform image acquisition for the biometric part;
   if the flow volume is less than or equal to the preset flow volume threshold, control each vision sensor to periodically perform image acquisition for the biometric part within a preset time period.

19. The non-transitory computer-readable storage medium according to claim 18, wherein the computer instructions are further used to cause the computer to:
   obtain first registration visual images corresponding to target objects acquired by first vision sensors in user terminals;
   receive object identification information corresponding to the first registration visual images sent by users through corresponding user terminals;
   perform feature extraction on each first registration visual image and associatively store each extracted registration feature information with corresponding object identification information.

20. The non-transitory computer-readable storage medium according to claim 18, wherein the computer instructions are further used to cause the computer to:
   compare acquisition time information corresponding to the target visual image of other type with acquisition time information corresponding to the first target visual image;
   if an acquisition time corresponding to the target visual image of other type is within an acquisition time range corresponding to the first target visual image, determine the object identification information corresponding to the first target visual image to be the object identification information corresponding to the target visual image of other type.

* * * * *